United States Patent
Siman tov et al.

(10) Patent No.: US 12,175,656 B2
(45) Date of Patent: Dec. 24, 2024

(54) GRAY LEVEL RATIO INSPECTION

(71) Applicant: Applied Materials Israel Ltd., Rehovot (IL)

(72) Inventors: Effi Siman tov, Rehovot (IL); Udi Abrahamov, Rehovot (IL)

(73) Assignee: Applied Materials Israel Ltd., Rehovot (IL)

( * ) Notice: Subject to any disclaimer, the term of this patent is extended or adjusted under 35 U.S.C. 154(b) by 362 days.

(21) Appl. No.: 17/678,773

(22) Filed: Feb. 23, 2022

(65) Prior Publication Data

US 2023/0267598 A1 Aug. 24, 2023

(51) Int. Cl.
*G06T 7/00* (2017.01)

(52) U.S. Cl.
CPC .... *G06T 7/001* (2013.01); *G06T 2207/10061* (2013.01); *G06T 2207/10152* (2013.01); *G06T 2207/20216* (2013.01); *G06T 2207/20224* (2013.01)

(58) Field of Classification Search
CPC ......... G06T 7/0004; G06T 2207/10061; G06T 7/001; G01N 2223/646; G01N 23/2251; G01N 2223/418
See application file for complete search history.

(56) References Cited

U.S. PATENT DOCUMENTS 8,538,130 B2 * 9/2013 Ivanchenko ........ G03F 7/70625
382/145

8,848,988 B2 * 9/2014 Plickert .............. G01N 21/8483
382/128

(Continued)

FOREIGN PATENT DOCUMENTS

CN 107004123 B * 11/2020 ............... G06K 9/52
JP 2014197814 A * 10/2014

(Continued)

OTHER PUBLICATIONS

S. Chen, H. Chen, Y. Long, F. Pan and W. Kai, "Detection of Electrical Defects by Distinguish Methodology Using an Advanced E-Beam Inspection System," 2020 China Semiconductor Technology International Conference (CSTIC), Shanghai, China, 2020, pp. 1-3, doi: 10.1109/CSTIC49141.2020.9282558. (Year: 2020).*

*Primary Examiner* — Michael Robert Cammarata
(74) *Attorney, Agent, or Firm* — Kilpatrick Townsend & Stockton LLP

(57) ABSTRACT

A method for gray level ratio inspection comprising: obtaining an electron image that comprises region of interest (ROI) pixels of a ROI of the sample and reference pixels of a reference region of the sample, where the ROI pixels are obtained by illuminating the ROI with the electron beam and the reference pixels are obtained without illuminating the reference region with an electron beam; calculating a reference dark level value based on values of at least some of the reference pixels; calculating, responsive to the reference dark level value, a gray level ratio between a first gray level value related to a first sub-set of the ROI pixels and a second gray level value related to a second sub-set of the ROI pixels; determining whether the gray level ratio is indicative of a defect; and generating defect information following a determination that the gray level ratio is indicative of the defect.

13 Claims, 8 Drawing Sheets

(56) References Cited

U.S. PATENT DOCUMENTS

| | | | |
|---|---|---|---|
| 2009/0294701 A1* | 12/2009 | Ebisawa | H04N 1/4076 |
| | | | 250/559.07 |
| 2014/0270471 A1* | 9/2014 | Cao | G01N 21/9501 |
| | | | 382/145 |
| 2017/0078527 A1* | 3/2017 | Fusayasu | H04N 1/00018 |
| 2018/0335396 A1* | 11/2018 | Nagano | H01J 37/28 |
| 2018/0336675 A1* | 11/2018 | Schwarzband | G06T 7/60 |
| 2020/0213474 A1* | 7/2020 | Otomaru | H04N 1/00814 |
| 2021/0333719 A1 | 10/2021 | Kapoano et al. | |
| 2021/0349019 A1 | 11/2021 | Kapoano et al. | |
| 2023/0206417 A1* | 6/2023 | Cohen | G06T 7/001 |
| | | | 382/145 |

FOREIGN PATENT DOCUMENTS

| | | | | |
|---|---|---|---|---|
| JP | 2022015847 A | * | 1/2022 | |
| WO | WO-2010054645 A2 | * | 5/2010 | G01N 21/8483 |
| WO | WO-2021261234 A1 | * | 12/2021 | H01L 27/14618 |
| WO | WO-2022016328 A1 | * | 1/2022 | G01N 21/25 |

* cited by examiner

GRAY LEVEL RATIO INSPECTION

STATEMENT AS TO RIGHTS TO INVENTIONS MADE UNDER FEDERALLY SPONSORED RESEARCH AND DEVELOPMENT

The project leading to this application has received funding from the ECSEL Joint Undertaking (JU) under grant agreement No. 826422 (PIN3S). The JU receives support from the European Union's Horizon 2020 research and innovation programme and Italy, Germany, Belgium, Sweden, Austria, Romania, Slovakia, France, Poland, Spain, Ireland, Switzerland, Israel.

BACKGROUND OF THE INVENTION

Gray level ratio (GLR) inspection include calculating a gray level ratio between gray levels of pixels of different features, for example, pixels of a background surface (minus a reference dark level) and pixels of a poly silicon conductor (minus the reference dark level).

The reference dark level is calculated one per several months. Nevertheless, the reference dark level may be change from one image to the other due various reasons including, for example, illumination changes, collection changes (for example changes induced by changes of photomultiplier voltage supply), and the like.

The changes in the reference dark level introduce significant errors in the calculation of the GLR.

There is a growing need to provide an accurate manner for GLR calculation.

BRIEF SUMMARY OF THE INVENTION

There may be provided a GLR inspection with dark level compensation.

BRIEF DESCRIPTION OF THE DRAWINGS

The subject matter regarded as the embodiments of the disclosure is particularly pointed out and distinctly claimed in the concluding portion of the specification. The embodiments of the disclosure, however, both as to organization and method of operation, together with objects, features, and advantages thereof, may best be understood by reference to the following detailed description when read with the accompanying drawings in which:

FIG. 6 is an example of multiple electron images; a

DETAILED DESCRIPTION OF THE INVENTION

Figure 1:
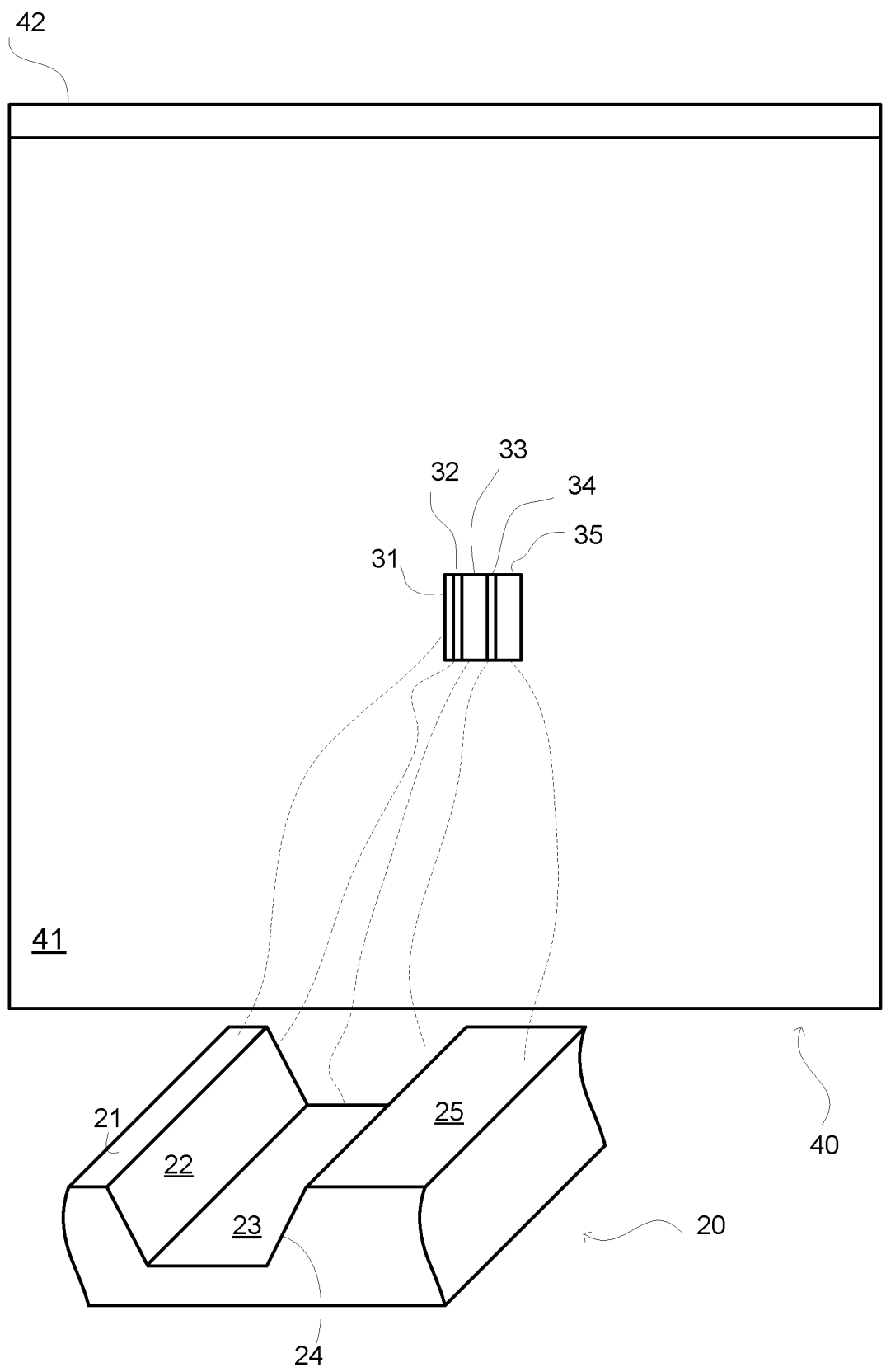
FIG. 1 is an example of a region of interest of a sample, a reference region of the sample, structural elements located within the region of interest.

In the following detailed description, numerous specific details are set forth in order to provide a thorough understanding of the embodiments of the disclosure.

However, it will be understood by those skilled in the art that the present embodiments of the disclosure may be practiced without these specific details. In other instances, well-known methods, procedures, and components have not been described in detail so as not to obscure the present embodiments of the disclosure.

The subject matter regarded as the embodiments of the disclosure is particularly pointed out and distinctly claimed in the concluding portion of the specification. The embodiments of the disclosure, however, both as to organization and method of operation, together with objects, features, and advantages thereof, may best be understood by reference to the following detailed description when read with the accompanying drawings.

It will be appreciated that for simplicity and clarity of illustration, elements shown in the figures have not necessarily been drawn to scale. For example, the dimensions of some of the elements may be exaggerated relative to other elements for clarity. Further, where considered appropriate, reference numerals may be repeated among the figures to indicate corresponding or analogous elements.

Because the illustrated embodiments of the disclosure may for the most part, be implemented using electronic components and circuits known to those skilled in the art, details will not be explained in any greater extent than that considered necessary as illustrated above, for the understanding and appreciation of the underlying concepts of the present embodiments of the disclosure and in order not to obfuscate or distract from the teachings of the present embodiments of the disclosure.

Any reference in the specification to a method should be applied mutatis mutandis to a system capable of executing the method.

Any reference in the specification to a system should be applied mutatis mutandis to a method that may be executed by the system.

The term "and/or" means additionally or alternatively.

There may be provided a system, method and a non-transitory computer readable medium for GLR inspection.

FIG. 1 illustrates an example of a region of interest (ROI) 41 of a sample, a reference region 42 of the sample, and structural elements located within the region of interest.

The structural elements include a first background surface element 21, a first sidewall 22 of a trench, a bottom 23 of the trench, a second sidewall 24 of the trench, and a second background surface 25. Any other structural elements may be provided.

The first background surface 21 and the second background surface 25 are located at a first height while the bottom 23 of the trench is located below the first height. The first background surface may differ from the bottom of the trench by material composition.

The first background surface element 21 is captured by a first sub-region 31 of the electron image 40. The first sidewall 22 of the trench is captured by a second sub-region 32 of the electron image 40. The bottom 23 of the trench is captured by a third sub-region 33 of the electron image 40. The second sidewall 24 of the trench is captured by a fourth sub-region 34 of the electron image 40. The second background surface 25 is captured by a fifth sub-region 35 of the electron image 40.

FIG. 1 illustrates a ROI and a reference region associated with the acquisition of an electron image. Other ROIs and/or other reference regions may be defined for different electron images. A reference region for one image may be part of an ROI of another image and vise verse.

The ROI may well exceed the reference region, for example, may include 2-10 lines in comparison to few hundreds and even more than 1000 lines of the ROI.

Figure 2:
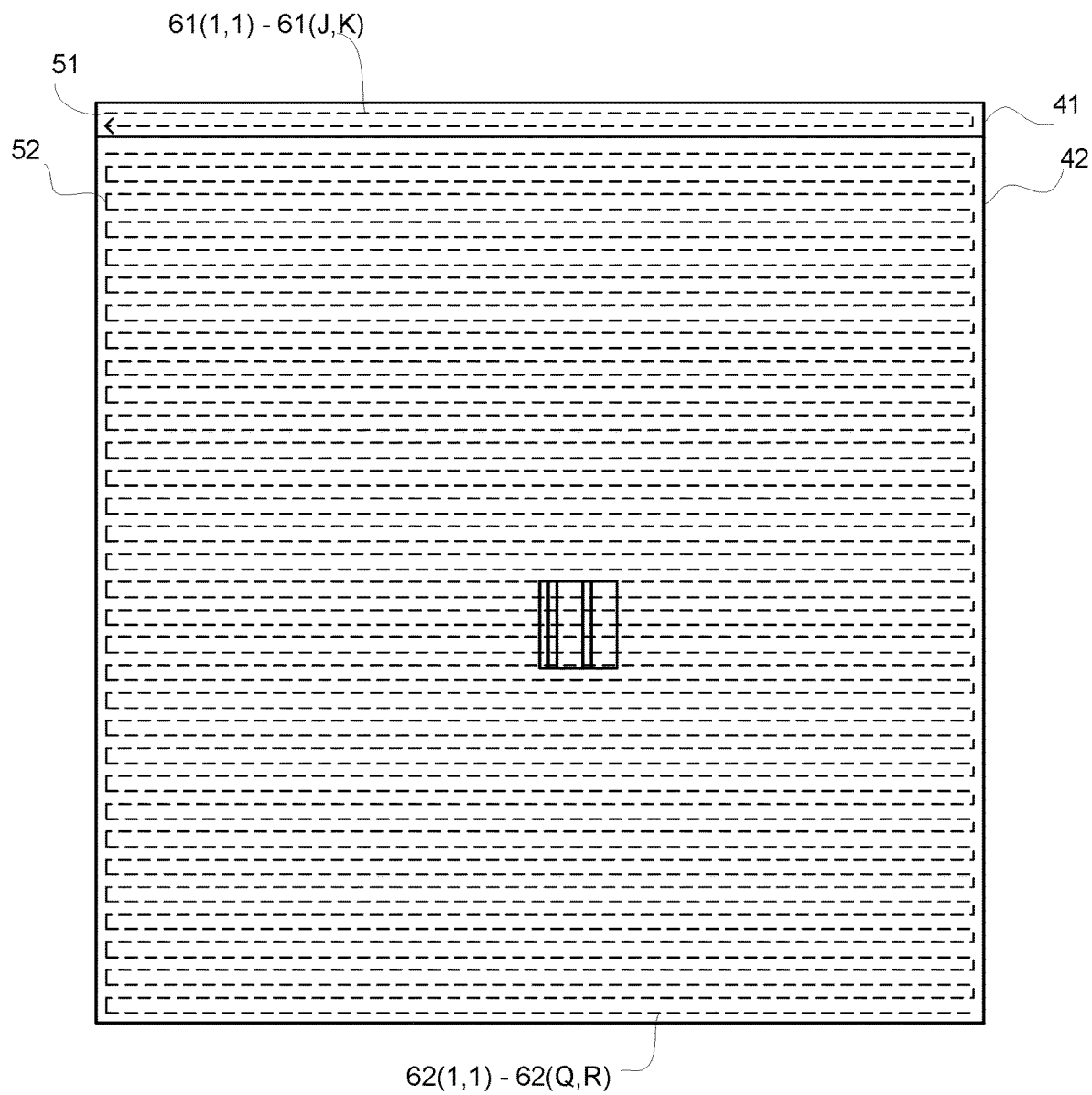
FIG. 2 is an example of a scan pattern that scans the region of interest and the reference region.

FIG. 2 illustrates a scan pattern for scanning the ROI 41 of the sample and the reference region 42 of the sample. FIG. 2 illustrates a scan pattern that is a raster scan pattern. Other scan patterns may be applied.

The scan pattern includes a first part 51 for scanning the reference region 41 and a second part 52 for scanning the ROI 41.

Figure 3:
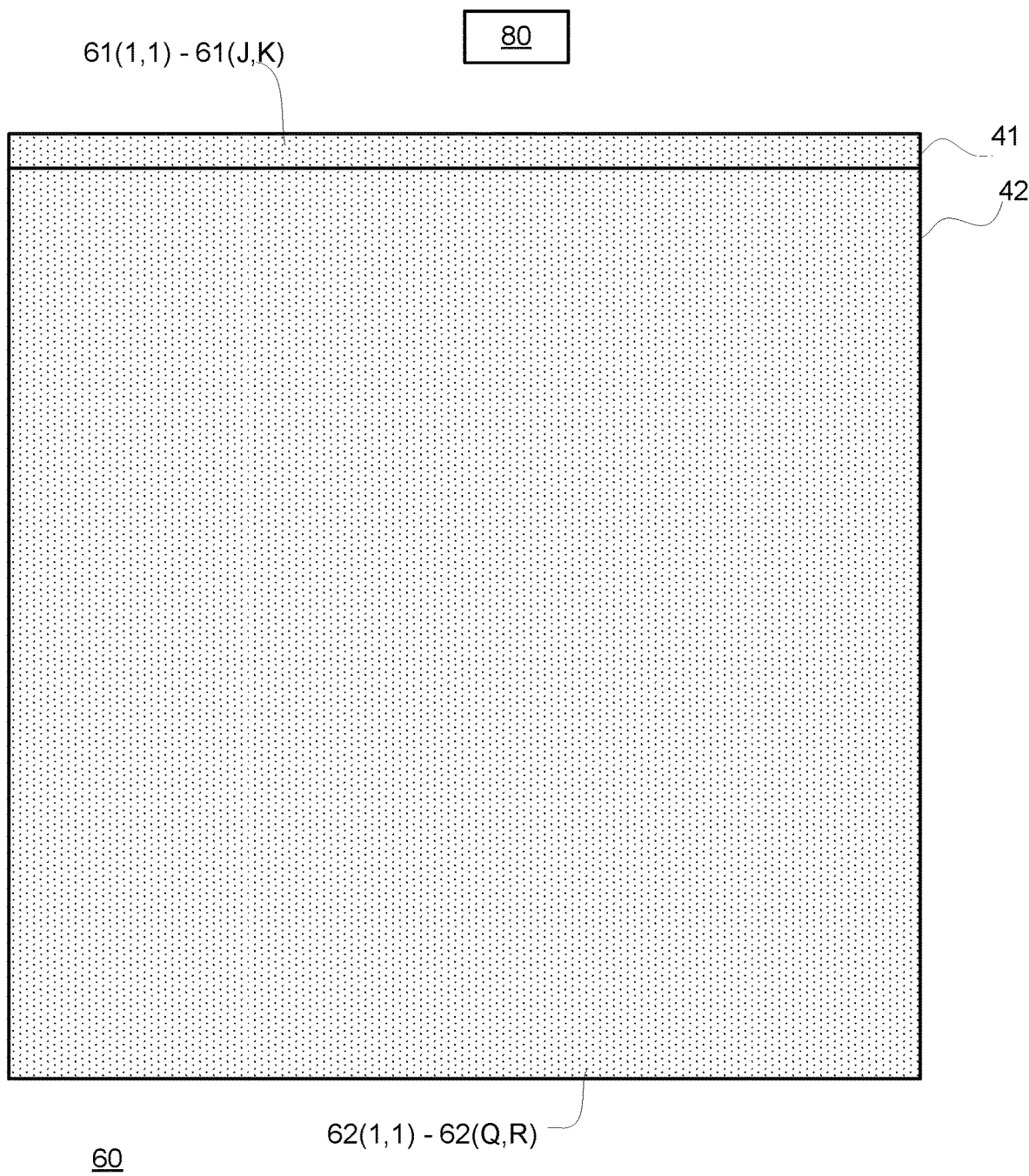
FIG. 3 is an example of a pixels of the region of interest, pixels of the reference region, and a reference dark level value.

FIG. 3 illustrates an image 61 of the ROI 41 and of the reference region 42.

FIG. 3 also illustrates the reference dark level value 80.

The ROI is captured by ROI pixels 62(1,1)-62(Q,R), Q and R represent rows and columns respectively and are positive integers.

The reference region is captured by reference pixels 61(1,1)-61(J,K), J and K represent rows and columns respectively and are positive integers.

Figure 4:
FIG. 4 is an example of a timing diagram.

FIG. 4 is a timing diagram 70 that illustrates multiple iterations of acquisition of electron images. The first electron image is acquired by acquiring a first reference region (during period 71(1)) and acquiring the first ROI (during period 72(1)).

The N'th electron image (N being a positive integer) is acquired by acquiring a N'th reference region (during period 71(N)) and acquiring the N'th ROI (during period 72(N)).

Figure 5:
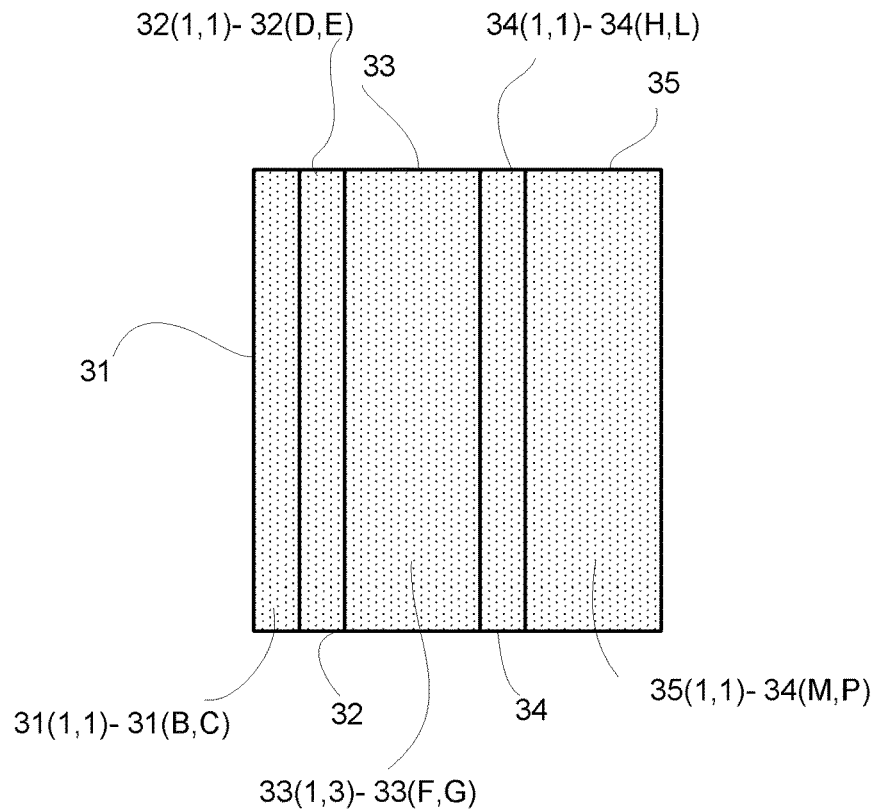
FIG. 5 is an example of a pixels of the structural elements and various data structures.
Figure 5:
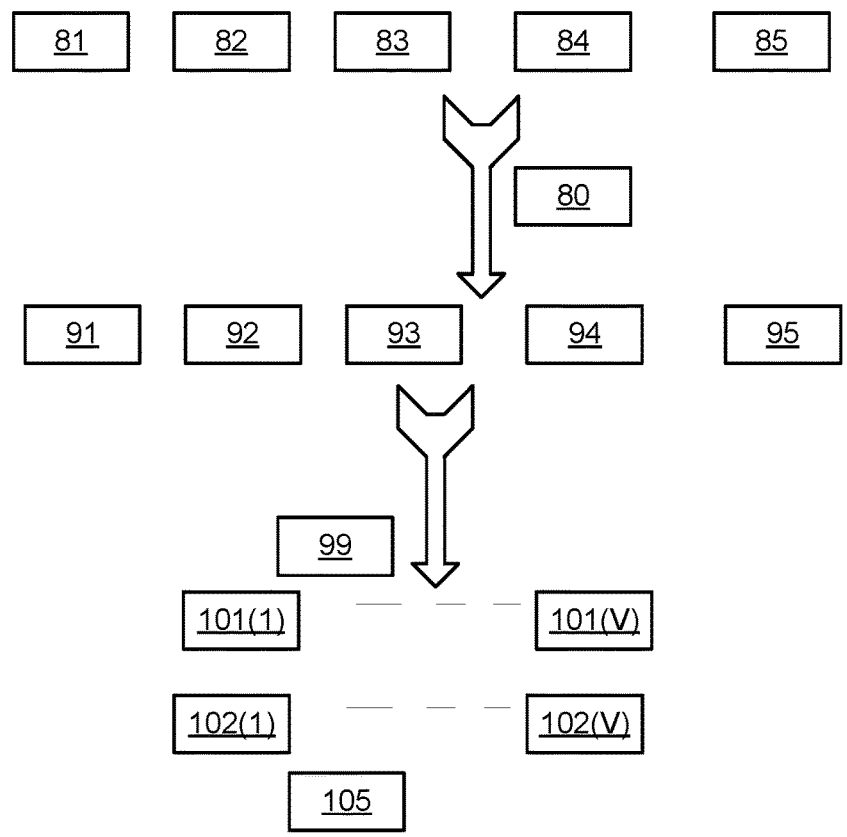

FIG. 5 is an example of pixels of the structural elements and various data structures.

The first background surface element 21 is captured by the first sub-region 31 that includes first background surface element pixels 31(1,1)-31(B,C).

The first sidewall 22 is captured by a second sub-region 32 of the electron image 40 that includes first sidewall pixels 32(1,1)-32(D,E).

The bottom 23 of the trench is captured by a third sub-region 33 that includes bottom pixels 33(1,1)-33(F,G).

The second sidewall 24 is captured by a fourth sub-region 34 that includes second sidewall pixels 34(1,1)-34(H,L).

The second background surface 25 is captured by a fifth sub-region 35 that includes second background surface 35(1,1)-35(M,P).

FIG. 5 illustrates a first gray level value 81 that is related to the first background surface element 21, a second gray level value 82 that is related to the second sidewall 22 of a trench, a third gray level value 83 that is related to the bottom 23 of the trench, a fourth gray level value that is related to the second sidewall 24 of the trench, and a fifth gray level value that is related to second background surface 25.

The reference dark level value is subtracted from the first gray level values to provide first dark level compensated value 91. The reference dark level value is subtracted from the second gray level values to provide second dark level compensated value 92. The reference dark level value is subtracted from the third gray level values to provide third dark level compensated value 93. The reference dark level value is subtracted from the fourth gray level values to provide fourth dark level compensated value 94. The reference dark level value is subtracted from the fifth gray level values to provide fifth dark level compensated value 95.

Any gray level ratio may be calculated in relation to the first till fifth gray level values and the reference gray level value 80.

Assuming that the gray level ratio 99 is the ratio between the third gray level value and the fifth gray level value.

The determining of whether a defect exists may include comparing the gray level ratio to (a) one or more gray level values indicative of a lack of defect 101(1)-101(V) and/or comparing the gray level ratio to (b) one or more gray level values indicative of a lack of defect 102(1)-102(V). The comparison may provide an indication whether the gray level ratio 99 is indicative of a defect, and if so, defect information 105 may be generated.

Figure 7:
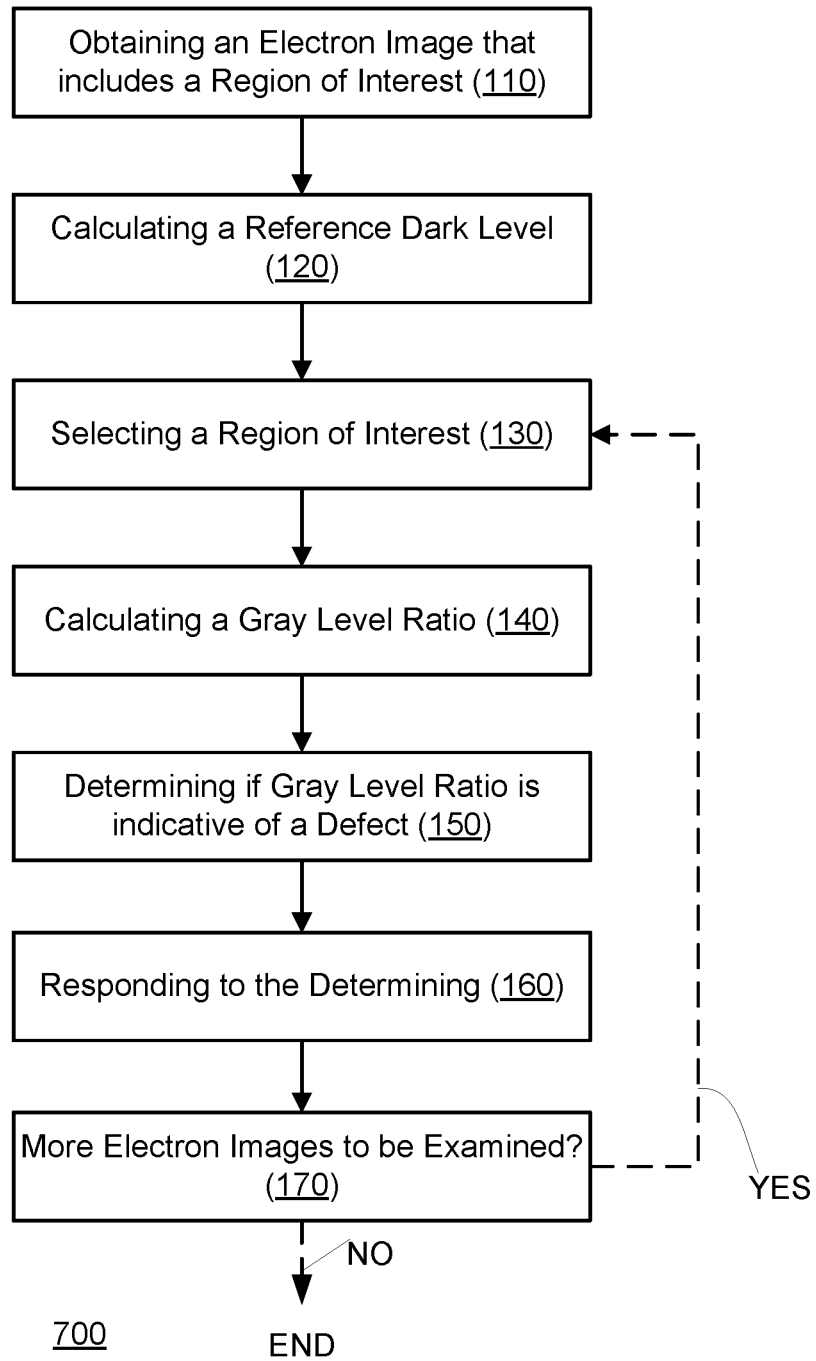
FIG. 7 is an example of a method.

FIG. 7 is an example of method 700 for gray level ratio inspection.

Figure 6:
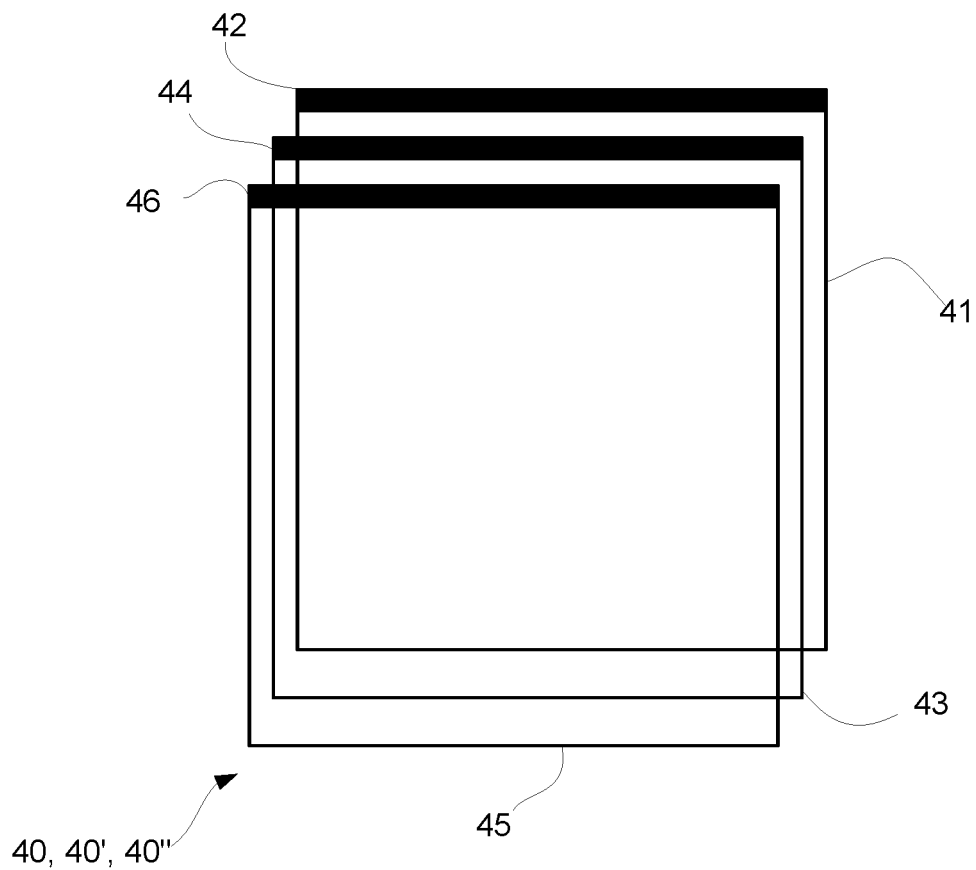

Method 700 may be executed for one or multiple electron images, such as images 40, 40' and 40" shown in FIG. 6.

Method 700 may start by step 110 of obtaining an electron image that may include region of interest (ROI) pixels of a ROI of the sample and reference pixels of a reference region of the sample.

The ROI pixels are obtained by illuminating the ROI with the electron beam.

The reference pixels are obtained without illuminating the reference region with an electron beam. The reference pixels may include deflecting the electron beam outside the sample, using a blanking unit, preventing from generating the electron beam, and the like.

Step 110 may include generating the electron image. The generating may include illuminating the ROI with the electron beam and detecting electrons emitted from the ROI.

Step 110 may include receiving the electron image.

Step 110 may include obtaining the electron image by applying a scan pattern that covers the reference region and the ROI. See, for example, the scan pattern of FIG. 2 that include a first part 51 for scanning the reference region 41 and a second part 52 for scanning the ROI 41

Step 110 may be followed by step 120 of calculating a reference dark level value based on values of at least some of the reference pixels.

The ROI may include multiple relevant sub-regions and many gray level ratios may be calculated. A relevant sub-region is a sub-region that should be evaluated—by applying a gray level ratio calculation.

The reference dark level value may be used for calculations of multiple gray level ratios of the ROI. This is illustrated by multiple repetitions of steps 130, 140, 150 and 160.

Assuming that there are multiple ROIs within the electron image than step 120 may be followed by step 130 of selecting an ROI of the multiple ROIs. Any selection process may be used. For example, the selection may be based on importance, priority, location of the ROI, and the like.

Step 130 may be followed by step 140 of calculating a gray level ratio between a first gray level value related to a first sub-set of the ROI pixels and a second gray level value related to a second sub-set of the ROI pixels.

The calculating is responsive to the reference dark level value.

The ROI and the reference regions may be adjacent to each other—see for example ROI 41 and reference region 42 of FIGS. 1 and 2. The ROI may be spaced apart from the reference region.

The first sub-set of the ROI pixels may be obtained from a first sub-region of the ROI, the second sub-set of the ROI pixels may be obtained from a second sub-region of the ROI.

The first sub-region may differ from the second sub-region by at least one of height and material composition. See, for example, at least the height differences between the first background surface element 21 and the bottom 23 of the trench of FIG. 1.

Step 140 may include:

Calculating the first gray level value (GL1) by Averaging gray levels of at least some of the first sub-set of the ROI pixels.

Calculating the second gray level value (GL2) by averaging gray levels of at least some of the second sub-set of the ROI pixels.

Subtracting the reference dark level value (GLref) from the first gray level value to provide a first dark level compensated value (GLcomp1).

Subtracting the reference dark level value from the second gray level value to provide a second dark level compensated value (GLcomp2).

Dividing the first dark level compensated value by the second dark level compensated value to provide the gray level ratio (GLR).

$$GLR=(GL1-GLref)/(GL2-GLref)=GLcomp1/GLcomp2.$$

Step 140 may be followed by step 150 of determining whether the gray level ratio is indicative of a defect.

Step 150 may be followed by step 160 of responding to the determining—for example generating defect information following a determination that the gray level ratio is indicative of the defect, storing the defect information, transmitting the defect detection, and the like.

Step 160 may also include jumping to step 130 when the electron image includes one or more unchecked ROIs. This conditional jumping may be executed in a step that differs from step 160.

When there are no unchecked ROIs, or when it is determined that the evaluation of the electron image is completed, step 160 may be followed by step 170 of checking if there are one or more electron images to be examined Step 150 may include at least one out of:

Comparing the gray level ratio to one or more gray level values indicative of a defect.

Comparing the gray level ratio to one or more gray level values indicative of a lack of defect.

Figure 8:
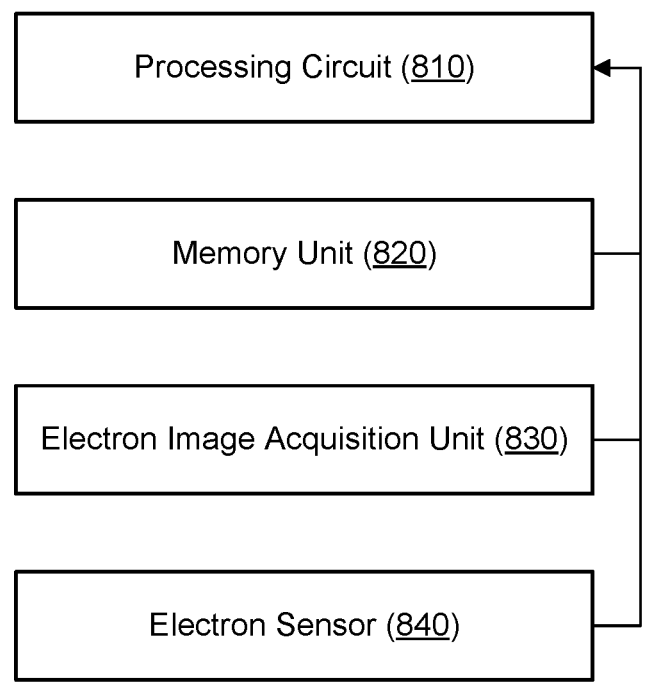
FIG. 8 is an example of a system.

FIG. 8 is an example of a computerized system 800 that includes a processing circuit 810, memory unit 820. The computerized system may include an electron image acquisition unit 830 that includes an electron sensor 840.

The computerized system may be a scanning electron microscope (SEM), an electron imager, may belong to a SEM, may belong to an electron imager, may be in communication with a SEM, may be in communication with an electron imager, or may receive the electron image in any manner.

The processing circuit 810 may be an image processor, may include one or more integrated circuits, and the like.

The processing circuit 810 may be configured to:

(a) obtain an electron image that comprises region of interest (ROI) pixels of a ROI of the sample and reference pixels of a reference region of the sample; wherein the ROI pixels are obtained by illuminating the ROI with the electron beam; wherein the reference pixels are obtained without illuminating the reference region with an electron beam;

(b) calculate a reference dark level value based on values of at least some of the reference pixels;

(c) calculate a gray level ratio between a first gray level value related to a first sub-set of the ROI pixels and a second gray level value related to a second sub-set of the ROI pixels; wherein the calculating is responsive to the reference dark level value;

(d) determine whether the gray level ratio is indicative of a defect; and (e) generate defect information following a determination that the gray level ratio is indicative of the defect.

In the foregoing specification, the embodiments of the disclosure has been described with reference to specific examples of embodiments of the disclosure. It will, however, be evident that various modifications and changes may be made therein without departing from the broader spirit and scope of the embodiments of the disclosure as set forth in the appended claims.

Moreover, the terms "front," "back," "top," "bottom," "over," "under" and the like in the description and in the claims, if any, are used for descriptive purposes and not necessarily for describing permanent relative positions. It is understood that the terms so used are interchangeable under appropriate circumstances such that the embodiments of the disclosure described herein are, for example, capable of operation in other orientations than those illustrated or otherwise described herein.

The connections as discussed herein may be any type of connection suitable to transfer signals from or to the respective nodes, units or devices, for example via intermediate devices. Accordingly, unless implied or stated otherwise, the connections may for example be direct connections or indirect connections. The connections may be illustrated or described in reference to be a single connection, a plurality of connections, unidirectional connections, or bidirectional connections. However, different embodiments may vary the implementation of the connections. For example, separate unidirectional connections may be used rather than bidirectional connections and vice versa. Also, plurality of connections may be replaced with a single connection that transfers multiple signals serially or in a time multiplexed manner. Likewise, single connections carrying multiple signals may be separated out into various different connections carrying subsets of these signals. Therefore, many options exist for transferring signals.

Any arrangement of components to achieve the same functionality is effectively "associated" such that the desired functionality is achieved. Hence, any two components herein combined to achieve a particular functionality may be seen as "associated with" each other such that the desired functionality is achieved, irrespective of architectures or intermedial components. Likewise, any two components so associated can also be viewed as being "operably connected," or "operably coupled," to each other to achieve the desired functionality.

Furthermore, those skilled in the art will recognize that boundaries between the above described operations merely illustrative. The multiple operations may be combined into a single operation, a single operation may be distributed in additional operations and operations may be executed at least partially overlapping in time. Moreover, alternative embodiments may include multiple instances of a particular operation, and the order of operations may be altered in various other embodiments.

Also for example, in one embodiment, the illustrated examples may be implemented as circuitry located on a single integrated circuit or within a same device. Alternatively, the examples may be implemented as any number of separate integrated circuits or separate devices interconnected with each other in a suitable manner.

However, other modifications, variations and alternatives are also possible. The specifications and drawings are, accordingly, to be regarded in an illustrative rather than in a restrictive sense.

In the claims, any reference signs placed between parentheses shall not be construed as limiting the claim. The word 'comprising' does not exclude the presence of other elements or steps then those listed in a claim. Furthermore, the terms "a" or "an," as used herein, are defined as one or more than one. Also, the use of introductory phrases such as "at least one" and "one or more" in the claims should not be construed to imply that the introduction of another claim element by the indefinite articles "a" or "an" limits any particular claim containing such introduced claim element to embodiments of the disclosure s containing only one such element, even when the same claim includes the introductory phrases "one or more" or "at least one" and indefinite articles such as "a" or "an." The same holds true for the use of definite articles. Unless stated otherwise, terms such as "first" and "second" are used to arbitrarily distinguish between the elements such terms describe. Thus, these terms are not necessarily intended to indicate temporal or other prioritization of such elements. The mere fact that certain measures are recited in mutually different claims does not indicate that a combination of these measures cannot be used to advantage.

While certain features of the embodiments of the disclosure have been illustrated and described herein, many modifications, substitutions, changes, and equivalents will now occur to those of ordinary skill in the art. It is, therefore, to be understood that the appended claims are intended to cover all such modifications and changes as fall within the true spirit of the embodiments of the disclosure.

What is claimed is:

1. A method for gray level ratio inspection, the method comprising:
    (a) obtaining an electron image that comprises region of interest (ROI) pixels of a ROI of the sample and reference pixels of a reference region of the sample, wherein the ROI pixels are obtained by illuminating the ROI with the electron beam and the reference pixels are obtained without illuminating the reference region with an electron beam;
    (b) calculating a reference dark level value based on values of at least some of the reference pixels;
    (c) calculating a gray level ratio between a first gray level value related to a first sub-set of the ROI pixels and a second gray level value related to a second sub-set of the ROI pixels, wherein the calculating of the gray level ratio comprises: (i) calculating the first gray level value by averaging gray levels of at least some of the first sub-set of the ROI pixels, (ii) calculating the second gray level value by averaging gray levels of at least some of the second sub-set of the ROI pixels, (iii) subtracting the reference dark level value from the first gray level value to provide a first dark level compensated value, (iv) subtracting the reference dark level value from the second gray level value to provide a second dark level compensated value, and (v) dividing the first dark level compensated value by the second dark level compensated value;
    (d) determining whether the gray level ratio is indicative of a defect; and
    (e) generating defect information following a determination that the gray level ratio is indicative of the defect.

2. The method according to claim 1, wherein the determining of whether the gray level ratio is indicative of a defect by comparing the gray level ratio to one or more gray level values indicative of a defect.

3. The method according to claim 1, wherein the determining of whether the gray level ratio is indicative of a defect by comparing the gray level ratio to one or more gray level values indicative of a lack of defect.

4. The method according to claim 1, wherein the ROI and the reference regions are adjacent to each other.

5. The method according to claim 1, wherein the obtaining of the electron image comprising applying a scan pattern that covers the reference region and the ROI.

6. The method according to claim 1, wherein the reference dark level value is an average of gray level values of the at least some of the reference pixels.

7. The method according to claim 1, wherein the first sub-set of the ROI pixels are obtained from a first sub-region of the ROI, the second sub-set of the ROI pixels are obtained from a second sub-region of the ROI; wherein the first sub-region differs from the second sub-region by at least one of height and material composition.

8. The method according to claim 1, comprising repeating steps (c), (d) and (e) for multiple pairs of sub-sets of ROI pixels that are associated with multiple pairs of sub-regions of the ROI, wherein the first sub-set of ROI pixels and the second sub-set of ROI pixels are one pair of the multiple pairs.

9. The method according to claim 1 wherein steps (a) to (e) are repeated for each electron image out of multiple electron images.

10. The method according to claim 9 wherein a reference region of one image is a part of a ROI of another electron image.

11. A non-transitory computer readable medium that stores computer-readable instructions for gray level ratio inspection by:
    (a) obtaining an electron image that comprises region of interest (ROI) pixels of a ROI of the sample and reference pixels of a reference region of the sample, wherein the ROI pixels are obtained by illuminating the ROI with the electron beam and the reference pixels are obtained without illuminating the reference region with an electron beam;
    (b) calculating a reference dark level value based on values of at least some of the reference pixels;
    (c) calculating a gray level ratio between a first gray level value related to a first sub-set of the ROI pixels and a second gray level value related to a second sub-set of the ROI pixels, wherein the calculating of the gray level ratio comprises: (i) calculating the first gray level value by averaging gray levels of at least some of the first sub-set of the ROI pixels, (ii) calculating the second gray level value by averaging gray levels of at least some of the second sub-set of the ROI pixels, (iii) subtracting the reference dark level value from the first gray level value to provide a first dark level compensated value, (iv) subtracting the reference dark level value from the second gray level value to provide a second dark level compensated value, and (v) dividing the first dark level compensated value by the second dark level compensated value;
    (d) determining whether the gray level ratio is indicative of a defect; and
    (e) generating defect information following a determination that the gray level ratio is indicative of the defect.

12. A computerized system for gray level ratio inspection, the system comprising a processing circuit that is configured to cause the system to:
    (a) obtain an electron image that comprises region of interest (ROI) pixels of a ROI of the sample and reference pixels of a reference region of the sample, wherein the ROI pixels are obtained by illuminating the ROI with the electron beam and the reference pixels are obtained without illuminating the reference region with an electron beam;
(b) calculate a reference dark level value based on values of at least some of the reference pixels;
(c) calculate a gray level ratio between a first gray level value related to a first sub-set of the ROI pixels and a second gray level value related to a second sub-set of the ROI pixels, wherein the calculating of the gray level ratio comprises: (i) calculating the first gray level value by averaging gray levels of at least some of the first sub-set of the ROI pixels, (ii) calculating the second gray level value by averaging gray levels of at least some of the second sub-set of the ROI pixels, (iii) subtracting the reference dark level value from the first gray level value to provide a first dark level compensated value, (iv) subtracting the reference dark level value from the second gray level value to provide a second dark level compensated value, and (v) dividing the first dark level compensated value by the second dark level compensated value;
(d) determine whether the gray level ratio is indicative of a defect; and
(e) generate defect information following a determination that the gray level ratio is indicative of the defect.

13. The computerized system according to claim 12, wherein the system comprises an electron image acquisition unit that comprises a electron sensor.

* * * * *